(12) United States Patent
Kulkarni (10) Patent No.: US 10,209,985 B2
(45) Date of Patent: Feb. 19, 2019

(54) DESCRIPTOR-TRANSFORMER FRAMEWORK IN AN INTEGRATION PLATFORM

(71) Applicant: SAP SE, Walldorf (DE)

(72) Inventor: Gopalkrishna Kulkarni, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/669,997

(22) Filed: Aug. 7, 2017

(65) Prior Publication Data
US 2018/0341477 A1  Nov. 29, 2018

(30) Foreign Application Priority Data
May 25, 2017  (IN) .............................. 201741018353

(51) Int. Cl.
  *G06F 9/44*   (2018.01)
  *G06F 8/76*   (2018.01)
  *G06F 9/54*   (2006.01)

(52) U.S. Cl.
  CPC ................ *G06F 8/76* (2013.01); *G06F 9/541* (2013.01); *G06F 9/547* (2013.01)

(58) Field of Classification Search
  CPC ....................................................... G06F 8/76
  USPC ................................................. 717/120–122
  See application file for complete search history.

(56) References Cited

U.S. PATENT DOCUMENTS

| 5,892,905 A * | 4/1999 | Brandt .................... H04L 63/02 709/202 |
| 6,633,835 B1 * | 10/2003 | Moran .................... H04L 47/10 702/181 |
| 9,823,900 B2 * | 11/2017 | Ouali ........................ G06F 8/10 |
| 2002/0184610 A1 * | 12/2002 | Chong ...................... G06F 8/20 717/109 |
| 2003/0037173 A1 * | 2/2003 | Pace ......................... G06F 8/60 719/310 |
| 2003/0105884 A1 * | 6/2003 | Upton ...................... G06F 9/541 719/318 |
| 2005/0091672 A1 * | 4/2005 | Debique ................... G06F 8/20 719/328 |
| 2008/0250434 A1 * | 10/2008 | Ho ......................... G06F 9/5027 719/329 |
| 2009/0222441 A1 * | 9/2009 | Broder ................ G06F 17/2785 |
| 2010/0158099 A1 * | 6/2010 | Kalva .............. H04N 21/23412 375/240.01 |

(Continued)

*Primary Examiner* — Chameli Das
(74) *Attorney, Agent, or Firm* — Buckley, Maschoff & Talwalkar LLC (57) ABSTRACT

Various embodiments of systems, computer program products, and methods to provide descriptor-transformer framework in an integration platform are described herein. In an aspect, an instruction to integrate a plurality of applications is received through a web interface application corresponding to the integration platform. A descriptor file associated with connectivity adapters corresponding to the plurality of applications is retrieved. Further, one or more preprocessor steps and/or one or more postprocessor steps are determined by analyzing the descriptor file. The plurality of applications is integrated by executing an integration flow based on the determined one or more preprocessor steps and/or one or more postprocessor steps.

15 Claims, 7 Drawing Sheets

(56) References Cited

U.S. PATENT DOCUMENTS

| | | | | |
|---|---|---|---|---|
| 2016/0140519 A1* | 5/2016 | Trepca | ............... | G06Q 20/12 |
| | | | | 705/26.44 |
| 2016/0267637 A1* | 9/2016 | Hsiao | .............. | G06Q 30/0256 |
| 2017/0168782 A1* | 6/2017 | Boyd | ..................... | G06F 8/34 |

* cited by examiner

```
<Descriptor>
 <map>
 <pair>
  <key>head</key>
   <value>bind(head)</value>
 <pair>
  <pair>
  <key>tail</key>
   <value>bind(tail)</value>
 <pair>
 </map>
```
─ ─ ─ ─ ─ ─ ─ ─ ─ ─ ─ ─ ─ ─ ─ ─ ─ ─ ─ ─ 310
```
 <bean class="com.dummy.ToUpperCase" id="u_util" singleInstance="true">
```
─ ─ ─ ─ ─ ─ ─ ─ ─ ─ ─ ─ ─ ─ ─ ─ ─ ─ ─ ─ 320
```
 <ReceiverComponent>
   <binding>name, decoratorMap, u_util<binding>
 </ReceiverComponent>
<Descriptor>
```

FIG. 3A

```
<blueprint>
```
─ ─ ─ ─ ─ ─ ─ ─ ─ ─ ─ ─ ─ ─ ─ ─ ─ ─ ─ ─ 330
```
 <bean class="java.util.HashMap" id="decorator">

<map>
     <entry key="head" value="****">
     <entry key="tail" value="-----">
   </map>
 </bean>
```
─ ─ ─ ─ ─ ─ ─ ─ ─ ─ ─ ─ ─ ─ ─ ─ ─ ─ ─ ─ 340
```
 <bean class="java.util.HashMap" id="decorator">

<map>
     <entry key="head" value="$$$$$">
     <entry key="tail" value="????">
   </map>
 </bean>
```
─ ─ ─ ─ ─ ─ ─ ─ ─ ─ ─ ─ ─ ─ ─ ─ ─ ─ ─ ─ 350
```
 <bean class="com.dummy.ToUpperCase id="toUtil1234">

<camelContext>
   <route>
     <to
uri="greet:foo?name="John"&decoratorMap=#decorator&u_util=util1234">
     <to
uri="greet:foo?name="Sarah"&decoratorMap=#decorator&u_util=util1234">
   </route>
 </camelContext>
</blueprint>
```

```
<Descriptor>
  <preprocessor>
    <class>com.dummy.Util.XMLToMapConverter</class>
  </preprocessor>
  <ReceiverComponent>
    <binding>name, decoratorMap, u_util<binding>
  </ReceiverComponent>
<Descriptor>
```

FIG. 5A

```
<blueprint>
  <bean class="java.util.HashMap" id="decorator">
    <map>
      <entry key="head" value="****">
      <entry key="tail" value="-----">
    </map>
  </bean>
  <bean class="com.dummy.UtilXMLToMapConverter id="preProcessor1">

<camelContext>
    <route>
      <bean id="preProcessor1">
      <to uri="greet:foo?name="World"&decoratorMap"=#decorator&u_util=util1234>
    </route>
  </camelContext>
</blueprint>
```

FIG. 5B

```
<Descriptor>
<postProcessor>

<class>com.dummy.Util.MapToXmlConverter</class>

</ postProcessor >
<ReceiverComponent>
   <binding>name, decoratorMap, u_util<binding>
</ReceiverComponent>
<Descriptor>
```

FIG. 6A

```
<blueprint>
<bean class="java.util.HashMap" id="decorator">
   <map>
     <entry key="head" value="****">
     <entry key="tail" value="-----">
   </map>
</bean>

<bean class="com.dummy.Util. MapToXmlConverter" id="postProcessor1">

<camelContext>
  <route>
    <to uri="greet:foo?name="World"&decoratorMap=#decorator&u_util=util1234>

<bean id="postProcessor1">
  </route>
</camelContext>
</blueprint>
```

DESCRIPTOR-TRANSFORMER FRAMEWORK IN AN INTEGRATION PLATFORM

RELATED APPLICATIONS

The present patent application claims the priority benefit of the filing date of Indian Patent Application No. 201741018353, filed 25 May 2017, titled "DESCRIPTOR TO BLUEPRINT ELEMENT TRANSFORMER", the content of which is incorporated herein by reference in its entirety.

BACKGROUND

A shift from on-premises applications to a hybrid mix of software-as-a-service (SaaS) and the on-premises applications has introduced challenges for companies attempting to simplify enterprise application integration. Integration platform as a service can provide a set of cloud-based tools to address these challenges. An integration platform may securely integrate different applications and services into a landscape using different connectivity adapters and transformation steps.

Further, the integration platform provides a custom development framework, where customers can add their own runtime components (e.g., the connectivity adapters associated with different third-party applications). With the custom development framework, available components (e.g., open source/custom-built components) can be hooked in the integration platform. However, challenge lies when there are additional steps required to be performed by the components (e.g., before and/or after calling the corresponding adapters) as the custom development framework may be required to adhere to a specific runtime. For example, when the integration framework uses Apache Camel™ component, the contract is to adhere to Camel component creation. In such a case, a developer may have to write complex code or modify Blueprint manually, which may not be supported by the integration platform.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

DETAILED DESCRIPTION

Embodiments of techniques to provide a descriptor-transformer framework in an integration platform are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instance, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such a sequence may be mainly for convenience and clarity. A particular step may be repeated more than once, may occur before or after other steps (even if those steps are otherwise described in another sequence), and may occur in parallel with other steps. Further, a step may be executed upon executing another step. Such a situation may be specifically pointed out when not clear from the context. A particular step may be omitted. Further, it is to be understood that the various actions (retrieving, determining, generating, persisting, recording, retrieving, analyzing, generating, integrating, executing and so on) may be performed by a hardware device (e.g., computing system), even if the action may be authorized, initiated or triggered by a user, or even if the hardware device is controlled by a computer program, software, firmware, and the like.

Figure 1:
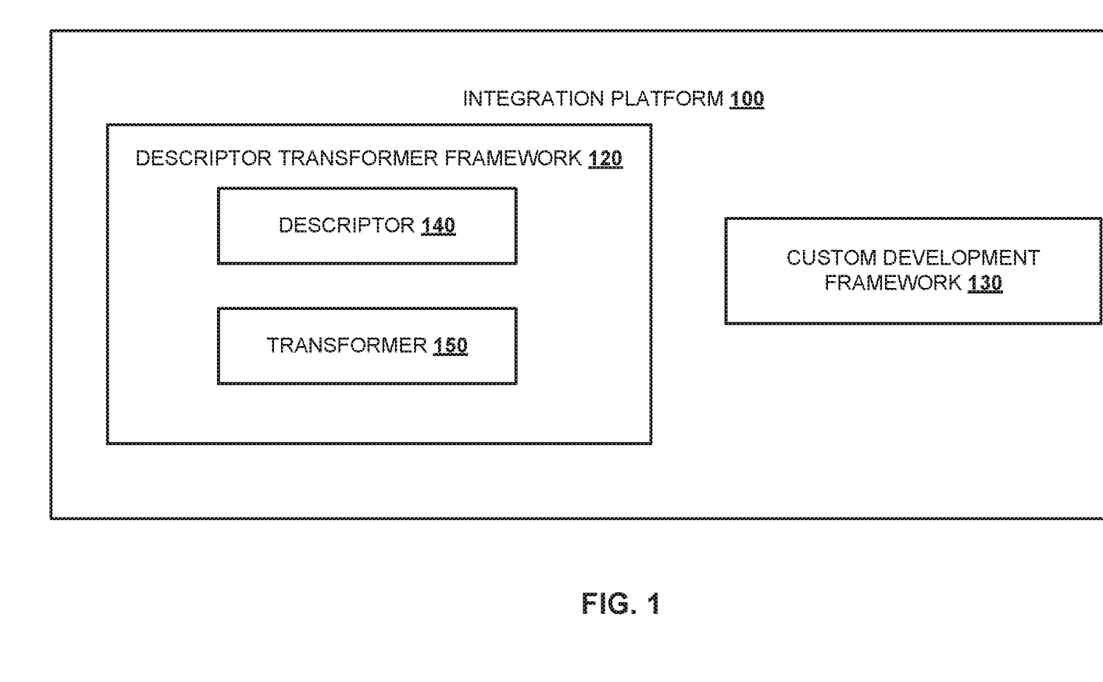
FIG. 1 is a block diagram of an example descriptor-transformer framework in an integration platform, according to one embodiment.

FIG. 1 is a block diagram of example descriptor-transformer framework 120 in integration platform 100, according to one embodiment. The integration platform 100 (e.g., SAP® cloud integration platform) may integrate processes, and data between cloud applications and on-premises solutions. Further, the integration platform 100 may support custom development framework 130 to hook components corresponding to different third-party applications (e.g., open source or custom-built applications), which may not be initially supported by the integration platform 100. Also, the integration platform 100 can provide a design time for developers to design integration flows, defining various required components before the integration flows can be deployed and executed. The integration platform 100 may have connectivity adapters and transformation steps to build integration scenarios. The connectivity adapters perform discrete functions associated with applications. A connectivity adapter is configured for each of the applications.

For example, SAP® cloud integration provides a framework to develop custom connectivity adapters using Apache Camel™. Apache Camel™ is an open-source integration framework based on enterprise integration patterns. Camel component empowers to define routing and mediation rules in different domain-specific languages, including a Java™-based Fluent application programming interface (API), Spring or Blueprint extensible markup language (XML) configuration files, and a Scala® domain specific language (DSL). With the integration framework 100, a developer or a user may be able to generate connectivity adapters (e.g., call the Camel component with user interface (UI) values) to integrate the applications. Further, the Camel component uses uniform resource identifiers (UM) to work with transport or messaging model such as hypertext transfer protocol (HTTP), ActiveMQ™, Java Message Service (JMS), Java Business Integration (JBI), Service Component Architecture (SCA), Apache MINA or Apache CXF, as well as pluggable components and data format options. Apache Camel™ provides support for bean binding and seamless integration in the integration framework 100, for instance.

In one embodiment, the descriptor-transformer framework 120 in the integration framework 100 may include descriptor 140 and transformer 150. The descriptor 140 may include a descriptor file explaining a control flow of the integration required by the developer. For example, the control flow of the integration may include steps to be executed before or after calling the Camel component (i.e., to call a preprocessor bean which converts the data to a format understandable by the Camel component being used). During design time, the developer may generate the descriptor file to include plain language instructions (e.g., English like instructions) on additional functionalities corresponding to the connectivity adapters, a sequence of runtime components and validations corresponding to the additional functionalities to be performed. The descriptor file can be, but not limited to a text file and an XML file. The descriptor 140 is explained with greater detail with examples in FIG. 2.

In one embodiment, during runtime, the transformer 150 understands the descriptor file and performs platform specific transformation of the descriptor file using the custom development framework 130. For example, the transformer 150 may use a parser to automatically read the descriptor file, validates and creates required Blueprint elements. The parser may be a flat file parser if the descriptor file is a flat file or the parser may be an XML parser. The functions of the transformer 150 is described with examples in FIG. 2.

With the descriptor-transformer framework 120, the integration platform 100 facilitates the developers to add custom generation capabilities to the Blueprint based on the descriptor file. Hence, the integration framework 100 with the descriptor-transformer framework 120 integrates functions that are provided by a third-party (e.g., functions to enhance the interface or interaction) and the applications without having to write complex code associated with the connectivity adapters or modify Blueprint manually.

Figure 2:
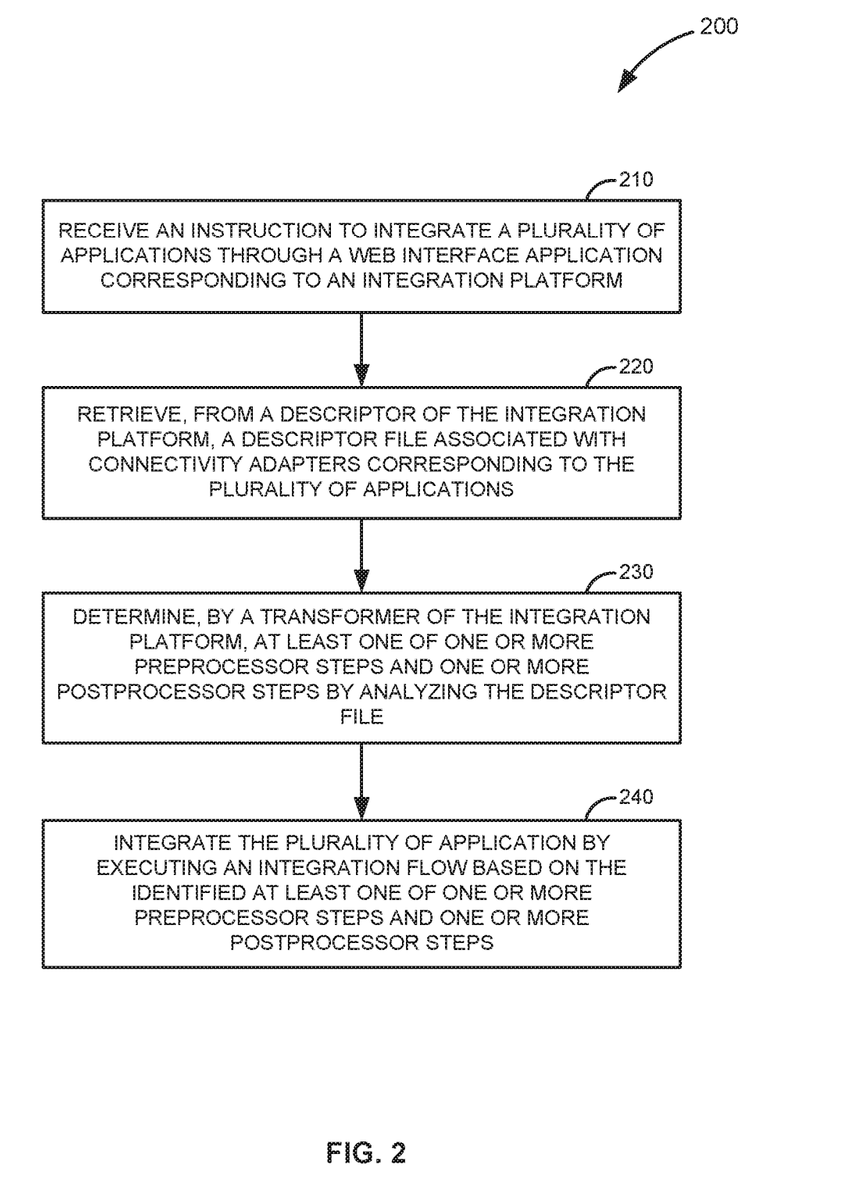
FIG. 2 is a flow diagram illustrating an example process to provide descriptor-transformer framework in an integration platform, according to an embodiment.

FIG. 2 is a flow diagram illustrating example process 200 to provide descriptor-transformer framework in an integration platform, according to an embodiment. The process 200 may include one or more functions or routines in the form of non-transitory computer-executable instructions that are stored in a tangible computer-readable storage medium and executed using a processor of a computing device. At 210, an instruction is received to integrate two or more applications through a web interface application. In one embodiment, a web interface application (i.e., integration platform such as SAP® cloud integration platform) is provided for designing an integration flow for integrating the applications using connectivity adapters, and for executing the integration flow during runtime. The integration platform supports integration of different applications by hooking corresponding connectivity adapters. Further, the integration platform may include a descriptor-transformer framework and a custom development framework for integrating the applications.

At 220, a descriptor file associated with the connectivity adapters corresponding to the applications is retrieved. The descriptor file may include plain language instructions on additional functionalities corresponding to the connectivity adapters (e.g., additional steps to be performed before or after calling the application), a sequence of runtime components and validations corresponding to the additional functionalities to be performed. For example, SAP® cloud integration platform uses Apache® Blueprint configuration as runtime representation. In the integration platform, when a developer desires to convert an incoming input to a data format before calling the actual Camel component, the descriptor file with simple plain language instructions may be generated, during design time, as depicted in Table 1. In the example, the descriptor file states that a pre-processor component is called before calling the actual connectivity adapter.

TABLE 1

<Descriptor>
  <preprocessor>
    <class>com.dummy.Util.XMLToMapConverter</class>
  </preprocessor>
<Descriptor>

In another example, consider calling a 'greeting' adapter which states 'Hello World' and provide additional object or component (e.g., Map Object) to decorate the message 'Hello World.' To perform the additional step of decoration, the descriptor file may be generated as shown in Table 2.

TABLE 2

<Descriptor>
  <map>
    <pair>
      <key>head</key>
      <value>bind(head)</value>
    <pair>
    <pair>
      <key>tail</key>
      <value>bind(tail)</value>
    <pair>
  </map>
  <ReceiverComponent>
    <binding>name, decoratorMap<binding>
  </ReceiverComponent>
<Descriptor>

At 230, preprocessor steps and/or postprocessor steps are determined by analyzing the descriptor file. In one embodiment, a transformer in the descriptor-transformer framework, during runtime, understands the descriptor file and performs platform specific transformation of the descriptor file using the custom development framework. For example, the transformer analyzes the descriptor file of Table 2 to automatically determine an existence of a postprocessor step and generates a Blueprint as depicted in Table 3.

TABLE 3

```
<blueprint>
  <bean class="java.util.HashMap" id="decorator">
    <map>
      <entry key="head" value="****">
      <entry key="tail" value="-----">
    </map>
  </bean>
  <camelContext>
    <route>
      <to uri="greet:foo?name="World"&decoratorMap=#decorator>
    </route>
  </camelContext>
</blueprint>
```

At 240, the applications are integrated by executing an integration flow based on the determined preprocessor steps and/or postprocessor steps. In the example, 'greeting' is a runtime Apache Camel™ component (e.g., a Java™ class) which uses a name string) and a map with key values. Based on the descriptor file of Table 2, an additional functionality (e.g., decorating the string, i.e., preprocessor step) is called before calling the 'greeting' component. Further, the transformer in the integration framework generates the Blueprint as shown in Table 3 based on the descriptor file of Table 2. When the Blueprint is executed, a user interface (UI) is generated, where the developer can input a value for the name (e.g., 'World') and provide formatting strings head='**' and tail='----.' For example, a result of the integration displays 'Hello **World----.' Hence, the developer specifies the requirement using the descriptor file and the transformer automatically transforms the descriptor file to runtime representation.

The descriptor-transformer framework provides a simple and intuitive way for non-technical persons to design the integration flows. For example, in integration as a service, the order or sequence of processing may be controlled by dependency injection and route builder (e.g., Apache Camel™) frameworks. In a route sequence, a connectivity adapter may be injected in a specific place, for example, after processing the preprocessor step. Further, the descriptor-transformer framework controls the usage of components in a specific way to adhere to the runtime capabilities.

In one embodiment, the descriptor-transformer framework is secure and performs validations on the descriptor file. For example, the descriptor-transformer framework performs a check to validate whether user interface values are matching to the runtime component's requirement. Another validation could be a dependent service validation. For example, a 'data formatter' adapter may be dependent on a 'XMLUtil' service. The descriptor-transformer framework may check whether the dependency is met or not during the build time and provide validation messages accordingly. For example, when a dependency to an external service is added with a version 1.0 and the external service is then modified centrally for higher version by removing the older one, the descriptor-transformer framework may notify a build error with respect to the external service.

Figure 3A:
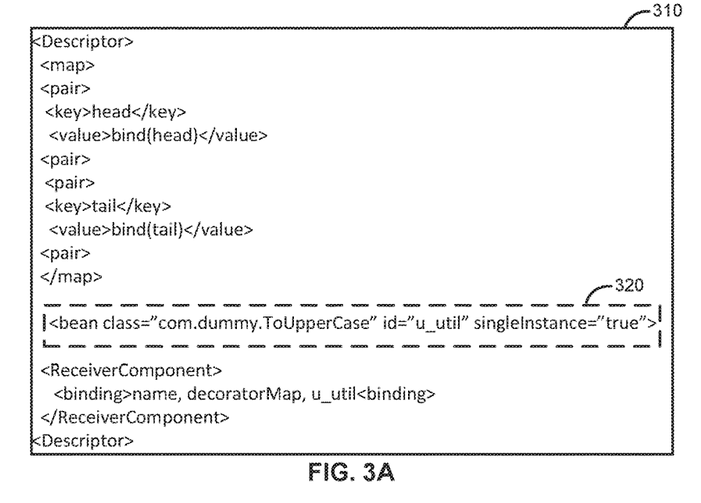
FIG. 3A is an example descriptor file, according to an embodiment.

In one embodiment, the descriptor-transformer framework provides generation of single instance runtime components across the integration platform. For example, consider enhancing the requirement of decorating a message (e.g., as depicted in Table 2) that displays 'greeting' in upper case, To enhance the requirement, an additional service (e.g., a Java™ class such as 'com.dummy.ToUpperCase') may be used. In the scenario, there is no need to instantiate the 'ToUpperCase' class for each adapter instance in the integration flow, instead a single instance may be used. FIG. 3A is example descriptor file 310, according to an embodiment. The descriptor file 310 illustrate the additional service (e.g., 320) to enhance the requirement.

Figure 3B:
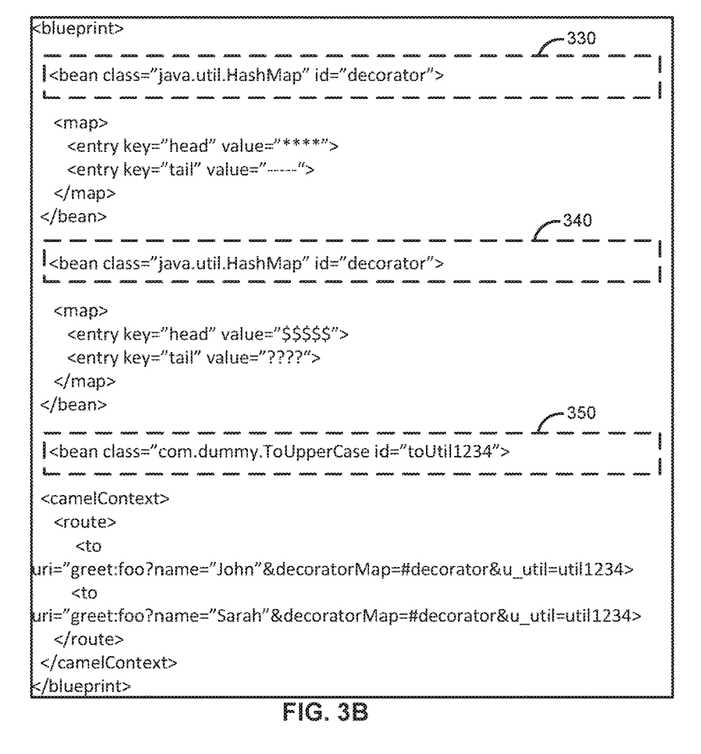
FIG. 3B is an example Blueprint of the descriptor file of FIG. 3A, according to an embodiment.

FIG. 3B is an example Blueprint of the descriptor file of FIG. 3A, according to an embodiment. For example, in runtime representation, there are two instances of map (e.g., 330 and 340) to decorate the message in different ways, but one instance of 'com.dummy.ToUpperCase' (e.g., 350) to enhance the requirement (e.g., to display the message in upper case). Thereby, result of the integration displays 'HELLO****JOHN----' and 'Hello$$$$$SARAH???.' Hence, the descriptor-transformer framework provides generation of single instance runtime components across the integration platform.

Figure 4:
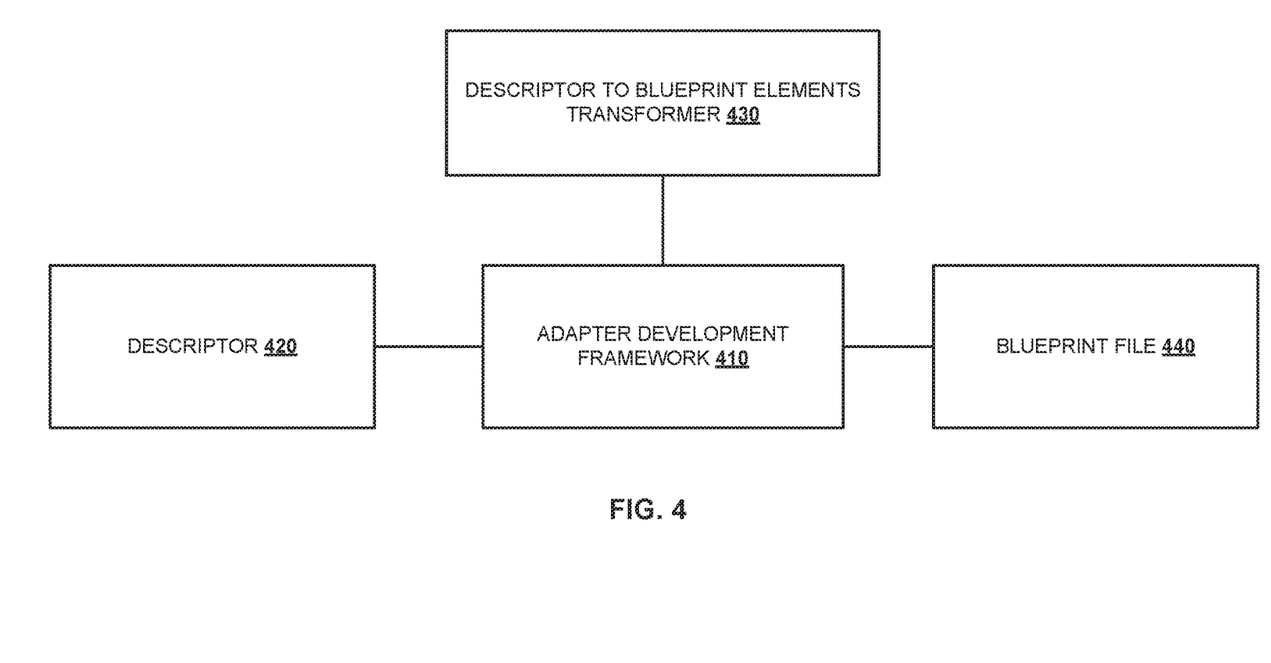
FIG. 4 is an example high level data flow diagram of a descriptor-transformer framework, according to an embodiment.

FIG. 4 is an example high level data flow diagram of a descriptor-transformer framework, according to an embodiment. An integration platform (e.g., SAP® cloud integration platform) facilitates the integration of applications (e.g., business processes). For example, SAP® cloud integration provides a framework to develop custom connectivity adapters using Apache™ Camel and SAP® adapter development (ADK) framework. In one embodiment, with the descriptor-transformer framework, adapter development framework 410 may be enhanced by introducing descriptor 420 and a transformer (e.g., descriptor to Blueprint elements transformer 430). In one example implementation, the descriptor 420 may be added as part of adapter development project generation to enhance the adapter development framework. Also, metadata for a descriptor file in the descriptor may be provided. For example, when the descriptor file is of type XML, there may be an XML schema definition (XSD) specification provided to a developer by the integration framework.

In one embodiment, during design time, the descriptor 420 may store the descriptor file describing the information of additional steps required to be called before and/or after calling actual connectivity adapters (e.g., Camel component). The Camel component is an open-source integration framework based on enterprise integration patterns, which assists to define routing and mediation rules in different domain-specific languages, including a Java™-based Fluent application programming interface (API), Spring or Blueprint extensible markup language (XML) configuration files, and a Scala® domain specific language (DSL). Hence, the descriptor 420 facilitates calling preprocessor beans (e.g., as described in FIG. 5A), calling post processor beans (e.g., as described in FIG. 6A) and updating the call to the Camel component created as part of the application development framework 410.

For example, the developer may call the preprocessor bean 'com.example.FlatFileToXMLConverter.java' before making the Camel component being used. Example descriptor file may be as depicted in Table 4. Similarly, the descriptor 420 may be able to provide a feature for post processing or updating the call to camel component i.e. <camel:to> tag.

TABLE 4

```
<GenerationDescriptor>
    <CustomBeans>
        <bean>
            <id>autoGenerate</id>
            <referenceName>flatFileToXml</referenceName>
            <class>com.example.converter.
            FlatFileToXmlConverter</class>
        </bean>
    </CustomBeans>
```

TABLE 4-continued

```
        <CustomPreProcessors>
            <processor>
                <referenceName>flatFileToXml</referenceName>
            </processor>
        </CustomPreProcessors>
</GenerationDescriptor>
```

In one embodiment, the descriptor to Blueprint elements transformer 430 understands the descriptor file (e.g., as shown in Table 4), validates and generates custom beans as per the specification of Blueprint. For example, a parser may be implemented to read the descriptor file, validates and creates required Blueprint elements. Further, the descriptor to Blueprint elements transformer 430 determines preprocessor steps and post processor steps based on the descriptor 420 and returns them as objects, which can be used by the adapter development framework 410 to update the resulting Blueprint (e.g., Blueprint 440). Further, the descriptor to Blueprint elements transformer 430 may take care of security so that malicious contents are not added to the Blueprint. For example, when a connectivity adapter is referring to a third-party bean, the descriptor-transformer framework may check if the third-party bean is malicious using code scanning or code analysis. For example, during an infinite loop analysis, code file can be scanned to check if a looping is used and not closed (e.g., no incrementor is used). When such an error occurs, the code can be disqualified to provide security. Also, the code can be analyzed to check for a structured query language (SQL) injection (e.g., vulnerability attack).

The descriptor-transformer framework may provide a mechanism to generate Blueprint tags (e.g., like beans) and refer them in a component (e.g., camel: from or camel: to tags, where default component URI need to be extended) and in another bean declarations using 'ref' attribute. Further, the descriptor-transformer framework may provide a mechanism to add custom tags (e.g., like <cxfcore:bus> for cxf component). Also, the descriptor-transformer framework provides a mechanism to add pre and post processor steps before calling the component (e.g., preprocessing step) and after calling the component (e.g., postprocessing step).

Figure 5A:
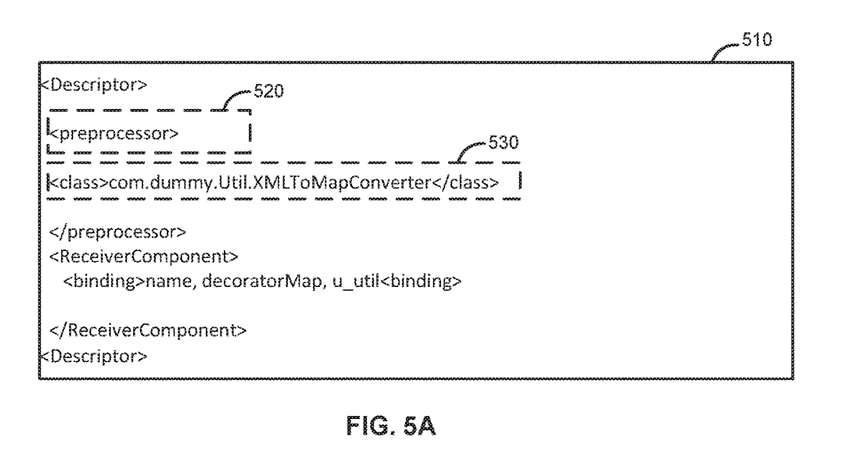
FIG. 5A is an example descriptor file, according to an embodiment.

FIG. 5A is example descriptor file 510, according to an embodiment. The descriptor file 510 describes a control flow of integration required by a developer. In the descriptor file 510, the developer has provided information to call a preprocessor bean (e.g., 520), such as 'com.dummy.Util.XMLToMapConverter' 530 before calling a Camel component (e.g., 'greeting' component). The descriptor file 510 includes plain language instructions (e.g., English like instructions) on what additional functionalities or capabilities the developer may be required by the component and sequence of runtime components.

Figure 5B:
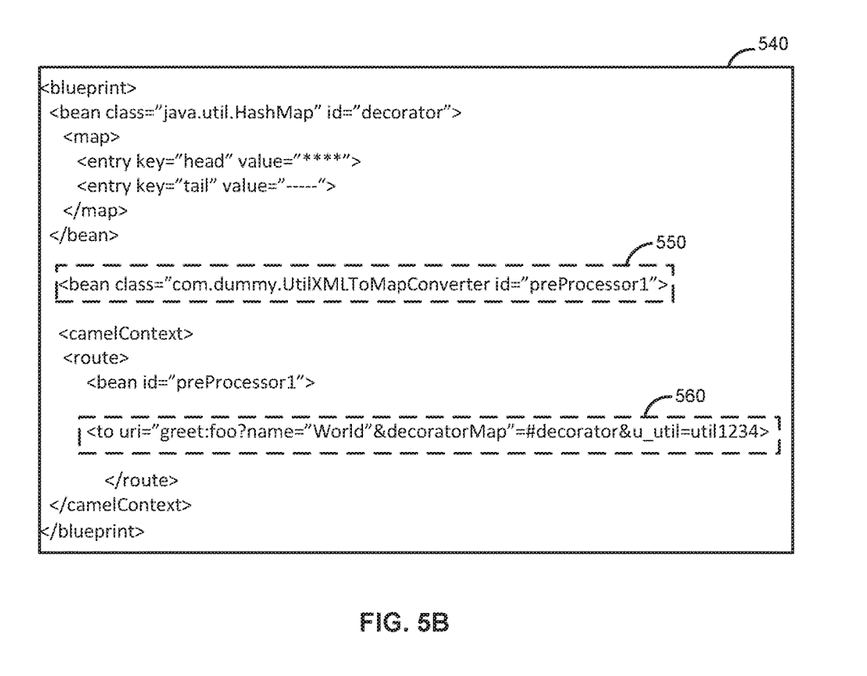
FIG. 5B is an example Blueprint of the descriptor file of FIG. 5A, according to an embodiment.

FIG. 5B is example Blueprint 540 of the descriptor file of FIG. 5A, according to an embodiment. A transformer in a descriptor-transformer framework analyzes the descriptor file (e.g., descriptor file 510) and performs platform specific transformation of the descriptor file 510 using a custom development framework of an integration platform. In the example, the Blueprint 540 corresponding to the descriptor file 510 of FIG. 5A is generated, where a preprocessor step (e.g., 'com.dummy.Util.XMLToMapConverter' 550) is called before calling 'greeting' component (e.g., 560).

Figure 6A:
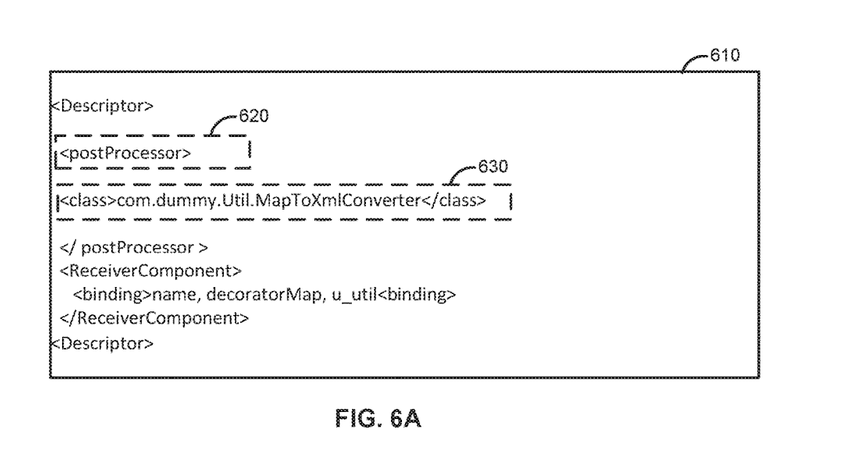
FIG. 6A is an example descriptor file, according to an embodiment.

FIG. 6A is example descriptor file 610, according to an embodiment. In the descriptor file 610, a developer has provided information to call a postprocessor bean (e.g., 620), such as 'com.dummy.Util.XMLToMapConverter' 630 after calling a Camel component (e.g., 'greeting' component). The descriptor file 610 include plain language instructions (e.g., English like instructions) on additional functionalities such as calling the postprocessing step after calling the Camel component.

Figure 6B:
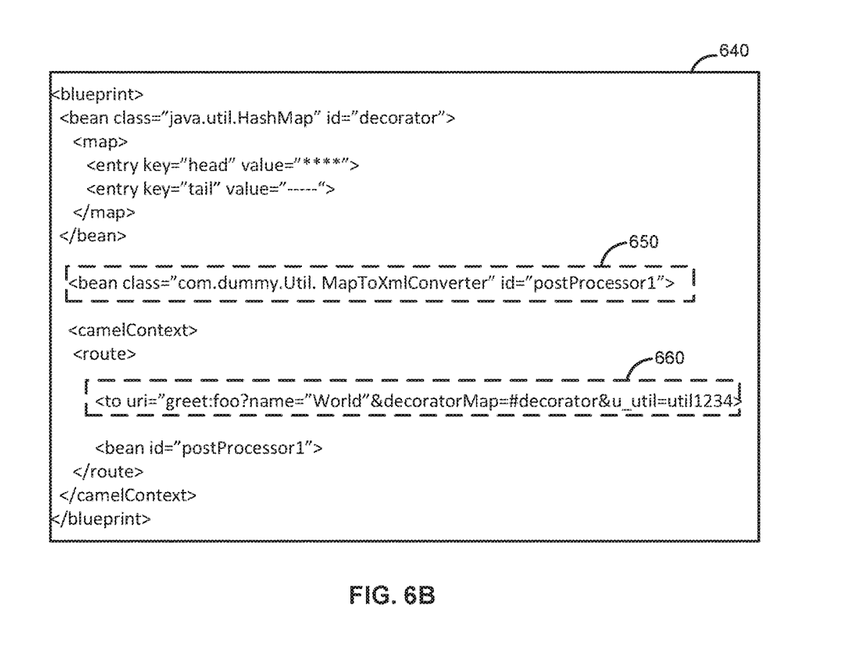
FIG. 6B is an example Blueprint of the descriptor file of FIG. 6A, according to an embodiment.

FIG. 6B is example Blueprint 640 of the descriptor file of FIG. 6A, according to an embodiment. A transformer in a descriptor-transformer framework analyzes the descriptor file (e.g., descriptor file 610) and performs platform specific transformation of the descriptor file 610 using a custom development framework of an integration platform. In the example, the Blueprint 640 corresponding to the descriptor file 610 of FIG. 6A is generated, where a postprocessor step (e.g., 'com.dummy.Util.XMLToMapConverter' 650) is called after calling 'greeting' component (e.g., 660).

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java™, C++, or other object-oriented programming language and development tools. Another embodiment may be implemented in hard-wired circuitry in place of, or in combination with machine readable software instructions.

Figure 7:
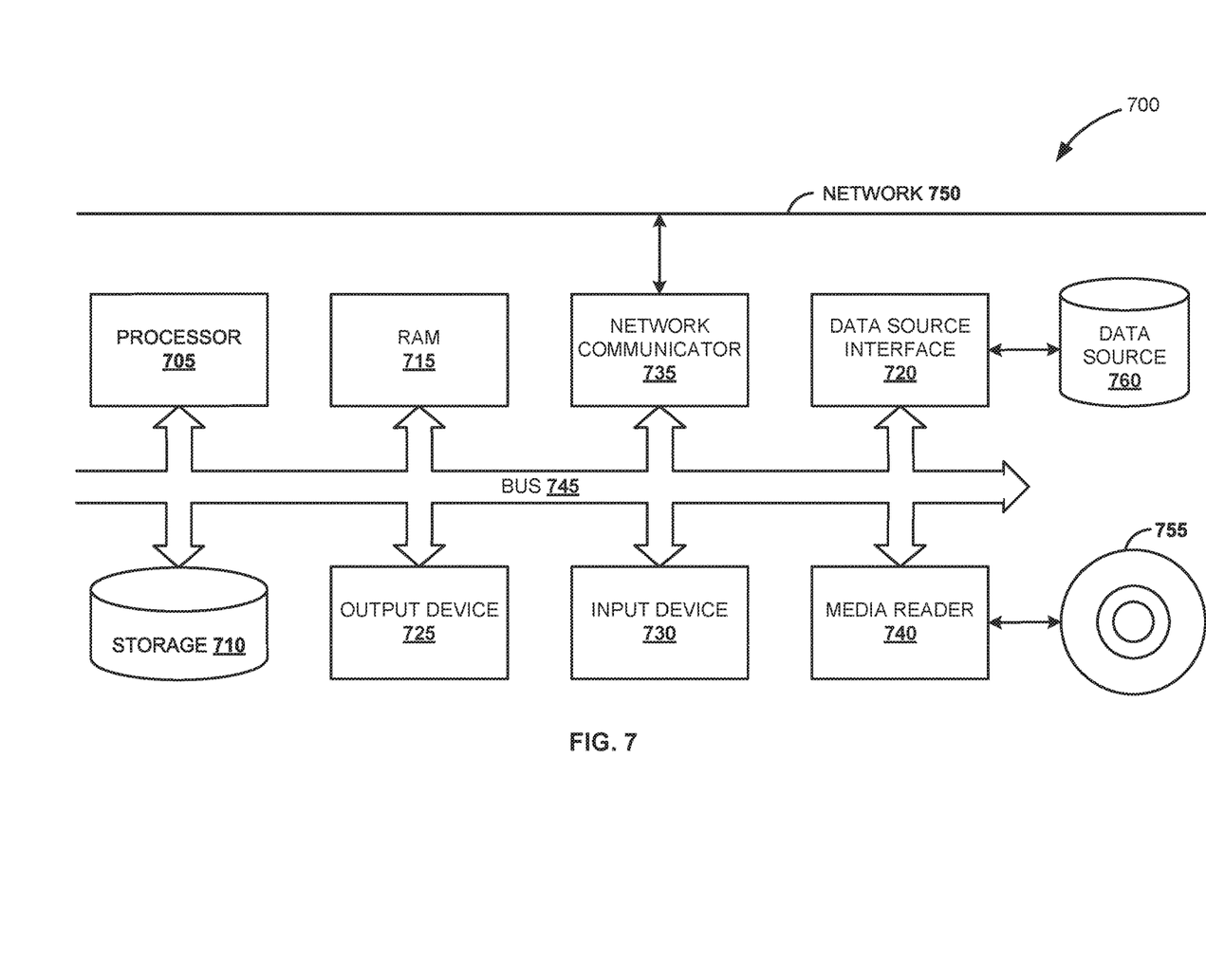
FIG. 7 is a block diagram illustrating an example computer system, according to an embodiment.

FIG. 7 is a block diagram of example computer system 700, according to an embodiment. The computer system 700 includes a processor 705 that executes software instructions or code stored on a computer readable storage medium 755 to perform the above-illustrated methods. The processor 705 can include a plurality of cores. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. According to some embodiments, such as some in-memory computing system embodiments, the RAM 715 can have sufficient storage capacity to store much of the data required for processing in the RAM 715 instead of in the storage 710. In some embodiments, the data required for processing may be stored in the RAM 715. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. One or more of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments, the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A computer-implemented method to provide a descriptor-transformer framework in an integration platform, comprising:
  receiving, via a web interface application of the integration platform, an instruction to integrate a plurality of applications;
  retrieving, from a descriptor component of the integration platform, a descriptor file associated with connectivity adapters corresponding to the plurality of applications, the descriptor file specifying a control flow of an integration of the plurality of applications including at least one of one or more preprocessor steps and one or more postprocessor steps to be performed before or after, respectively, calling at least one of the plurality of applications;
  determining automatically by a transformer component of the integration platform, in response to the retrieving of the descriptor file, the at least one of one or more preprocessor steps and one or more postprocessor steps specified by the descriptor file by analyzing the descriptor file during a runtime to generate a runtime representation of the integration of the plurality of applications; and
  integrating the plurality of applications by executing the runtime representation of the integration of the plurality of applications including the determined at least one of one or more preprocessor steps and one or more postprocessor steps, the web interface application being provided for designing an integration flow for integrating the plurality of applications using the connectivity adapters, and for executing the integration flow during runtime.

2. The computer-implemented method of claim 1, wherein the descriptor file comprises at least one of a text file or an extensible markup language (XML) file.

3. The computer-implemented method of claim 1, wherein the descriptor file comprises at least one of plain language instructions regarding additional functionalities corresponding to the connectivity adapters, a sequence of runtime components, and validations corresponding to the additional functionalities to be performed.

4. The computer-implemented method of claim 1, wherein the transformer component analyzes the descriptor file and performs a platform specific transformation of the descriptor file using a custom development framework.

5. The computer-implemented method of claim 1, further comprising generating single instance runtime components across the integration platform.

6. A computing system to provide a descriptor-transformer framework in an integration platform, comprising:
one or more memory devices storing processor-executable instructions; and
at least one processor to execute the processor-executable instructions to cause the system to:
receive, via a web interface application of the integration platform, an instruction to integrate a plurality of applications;
retrieve, from a descriptor component of the integration platform, a descriptor file associated with connectivity adapters corresponding to the plurality of applications, the descriptor file specifying a control flow of an integration of the plurality of applications including at least one of one or more preprocessor steps and one or more postprocessor steps to be performed before or after, respectively, calling at least one of the plurality of applications;
determine automatically by a transformer component of the integration platform, in response to the retrieving of the descriptor file, the at least one of one or more preprocessor steps and one or more postprocessor steps specified by the descriptor file by analyzing the descriptor file during a runtime to generate a runtime representation of the integration of the plurality of applications; and
integrate the plurality of applications by executing the runtime representation of the integration of the plurality of applications including the determined at least one of one or more preprocessor steps and one or more postprocessor steps, the web interface application being provided for designing an integration flow for integrating the plurality of applications using the connectivity adapters, and for executing the integration flow during runtime.

7. The computing system of claim 6, wherein the descriptor file comprises at least one of a text file or an extensible markup language (XML) file.

8. The computing system of claim 6, wherein the descriptor file comprises at least one of plain language instructions regarding additional functionalities corresponding to the connectivity adapters, a sequence of runtime components and validations corresponding to the additional functionalities to be performed.

9. The computing system of claim 6, wherein the transformer component analyzes the descriptor file and performs a platform specific transformation of the descriptor file using a custom development framework.

10. The computing system of claim 6, wherein the transformer generates single instance runtime components across the integration platform.

11. A tangible non-transitory computer readable storage medium storing instructions, which when executed by a computer cause the computer to:
receive, via a web interface application of the integration platform, an instruction to integrate a plurality of applications;
retrieve, from a descriptor component of the integration platform, a descriptor file associated with connectivity adapters corresponding to the plurality of applications, the descriptor file specifying a control flow of an integration of the plurality of applications including at least one of one or more preprocessor steps and one or more postprocessor steps to be performed before or after, respectively, calling at least one of the plurality of applications;
determine automatically, by a transformer component of the integration platform, in response to the retrieving of the descriptor file, the at least one of one or more preprocessor steps specified by the descriptor file and one or more postprocessor steps by analyzing the descriptor file during a runtime to generate a runtime representation of the integration of the plurality of applications; and
integrate the plurality of applications by executing the runtime representation of the integration of the plurality of applications including the determined at least one of one or more preprocessor steps and one or more postprocessor steps, the web interface application being provided for designing an integration flow for integrating the plurality of applications using the connectivity adapters, and for executing the integration flow during runtime.

12. The tangible non-transitory computer-readable medium of claim 11, wherein the descriptor file comprises at least one of a text file or an extensible markup language (XML) file.

13. The tangible non-transitory computer-readable medium of claim 11, wherein the descriptor file comprises at least one of plain language instructions on additional functionalities corresponding to the connectivity adapters, a sequence of runtime components and validations corresponding to the additional functionalities to be performed.

14. The tangible non-transitory computer-readable medium of claim 11, wherein the transformer component analyzes the descriptor file and performs platform specific transformation of the descriptor file using a custom development framework.

15. The tangible non-transitory computer-readable medium of claim 11, further comprising instructions, which when executed by the computer cause the computer to generate single instance runtime components across the integration platform.

* * * * *